United States Patent [19]
Machut

[11] Patent Number: 5,435,490
[45] Date of Patent: Jul. 25, 1995

[54] MULTIFUNCTIONAL ADJUSTABLE IRRIGATION SYSTEM FOR PLANT BEDDING AND LOW CROP ENVIRONMENTS

[76] Inventor: Daniel M. Machut, 23150 Crooked Arrow Dr., Lake Elsinore, Calif. 92532

[21] Appl. No.: 182,730
[22] Filed: Jan. 14, 1994
[51] Int. Cl.6 .......................... B05B 1/04; B05B 1/26; B05B 15/06
[52] U.S. Cl. ..................... 239/276; 239/457; 239/460; 239/499; 239/505; 239/DIG. 1
[58] Field of Search ............... 239/276, 289, 390, 451, 239/456–458, 537–539, 499, 505, 512, 518, DIG. 1, 542, 460

[56] References Cited

U.S. PATENT DOCUMENTS

| | | | |
|---|---|---|---|
| 207,756 | 9/1878 | Maguire | 239/276 |
| 2,212,533 | 8/1940 | Zimmerman | 239/457 |
| 3,586,239 | 6/1971 | Blass | 239/276 |
| 3,797,755 | 3/1974 | Saisho | 239/547 |
| 3,804,334 | 4/1974 | Curry | 239/276 |
| 4,722,481 | 2/1988 | Lemkin | 239/539 |

OTHER PUBLICATIONS

"Drip Mist, Drip Watering System" Garden America Corporation, Aug., 1988.
"Drip Irrigation Made Easy, Raindrip Shows You How" Copyright 1983, 1986 Raindrip, Inc.
Rain Bird "Drip Watering Guide, A Complete Guide to Installing Your Drip Watering System", undated.

Primary Examiner—Karen B. Merritt
Attorney, Agent, or Firm—Michael J. Folise

[57] ABSTRACT

A system for irrigating plant bedding environments comprising a helically threaded spray fitting adapted for insertion into standard plant bedding irrigation conduit. The spray fitting is adjustable in terms of flow direction and flow rate, and different embodiments produce distinct, leaf-shaped spray patterns. A special housing for the spray fitting allows the unit to be converted to a drip fitting.

16 Claims, 3 Drawing Sheets

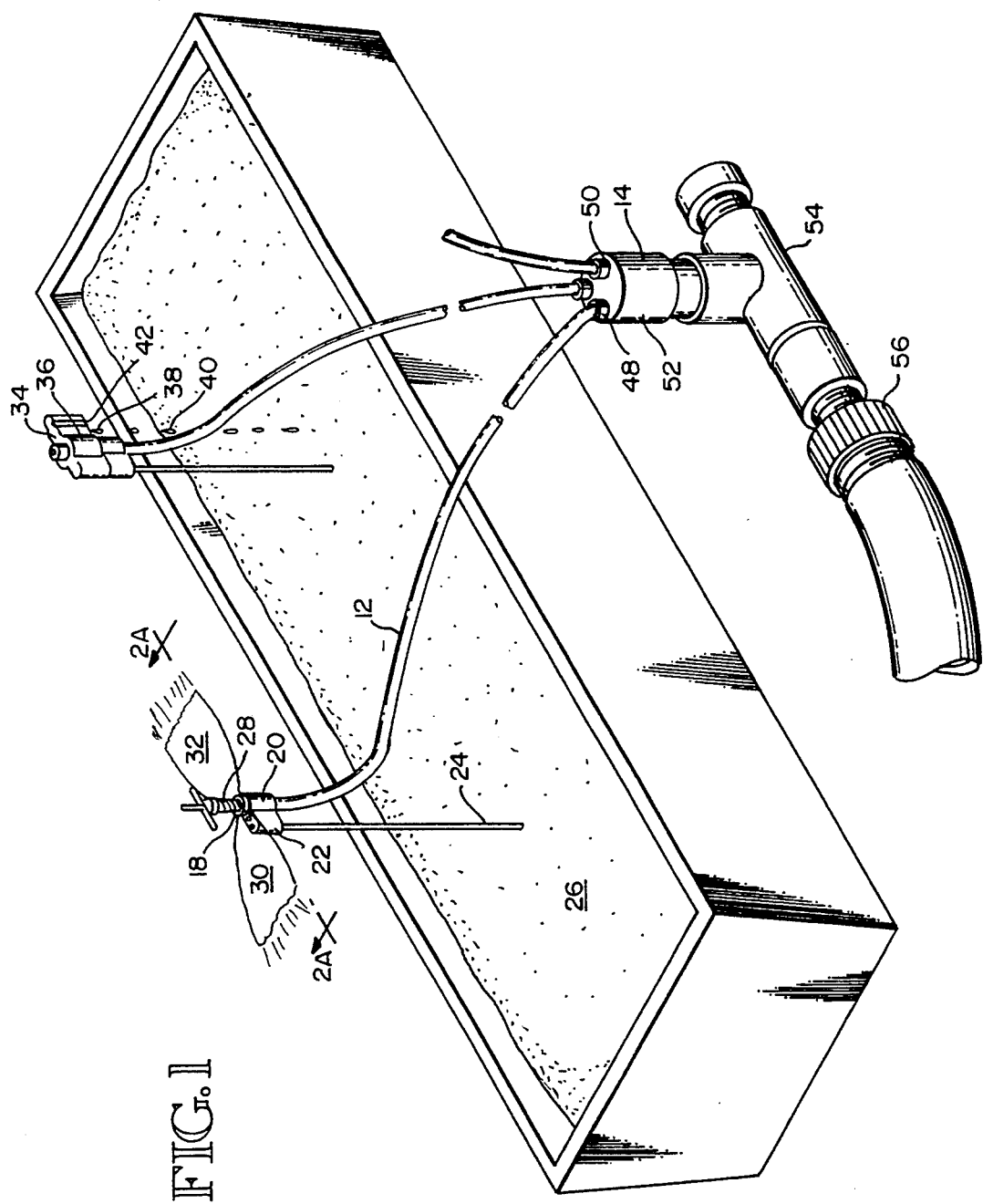

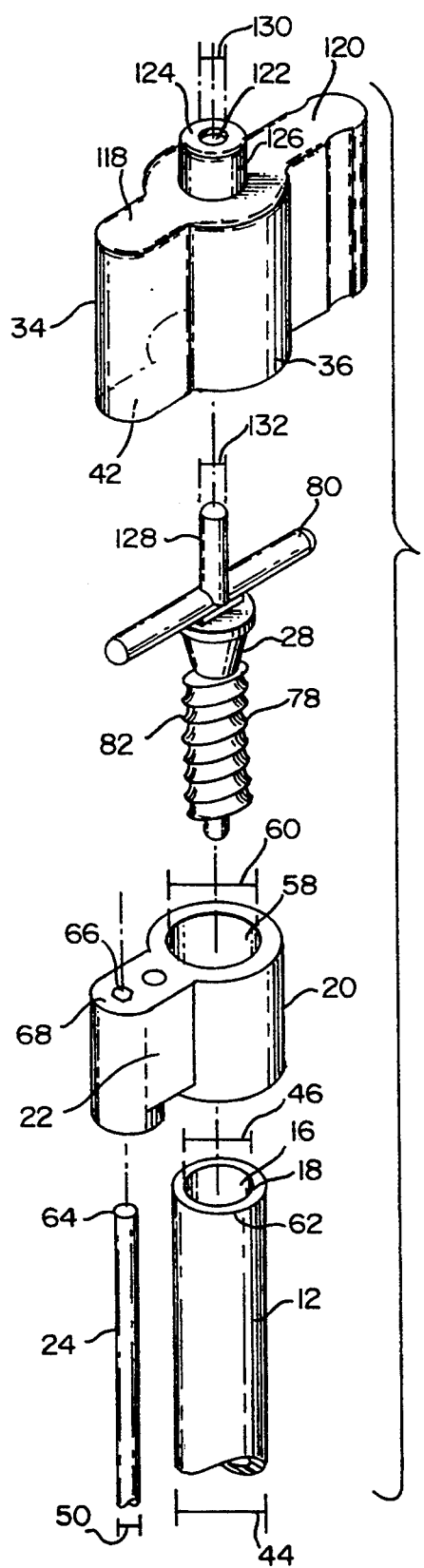
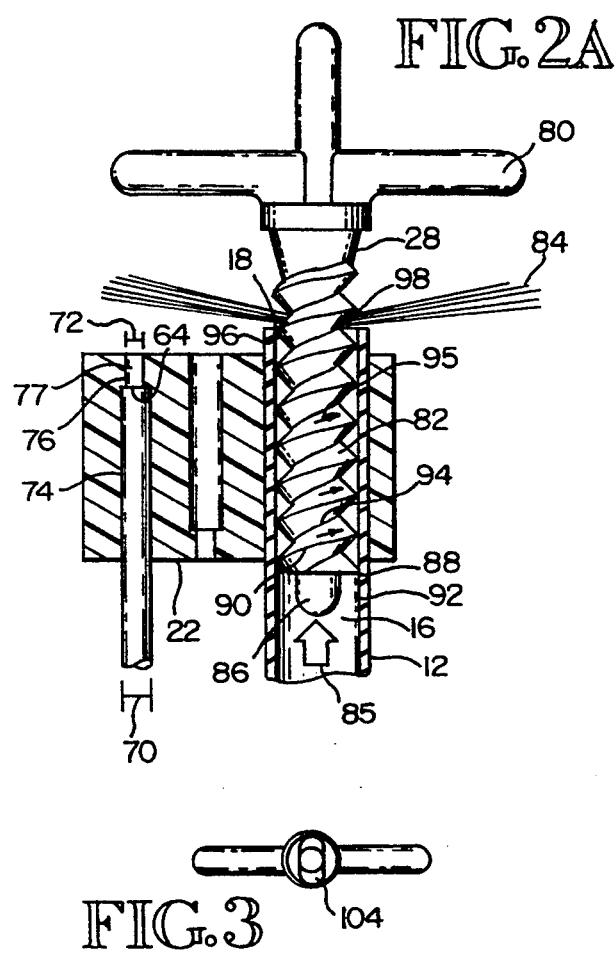
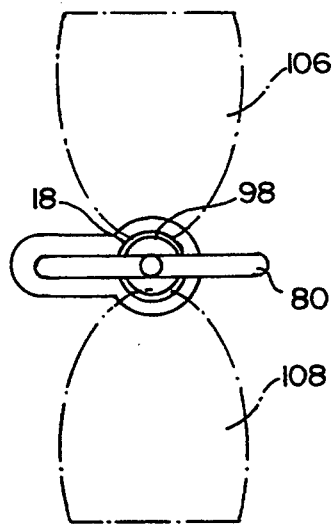

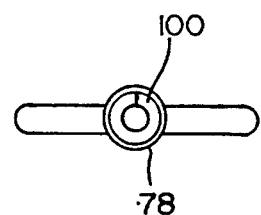
FIG. 5
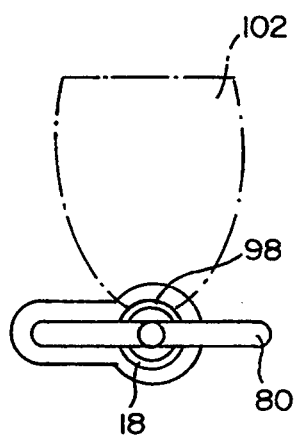
FIG. 6
FIG. 7
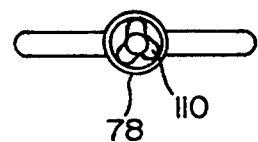
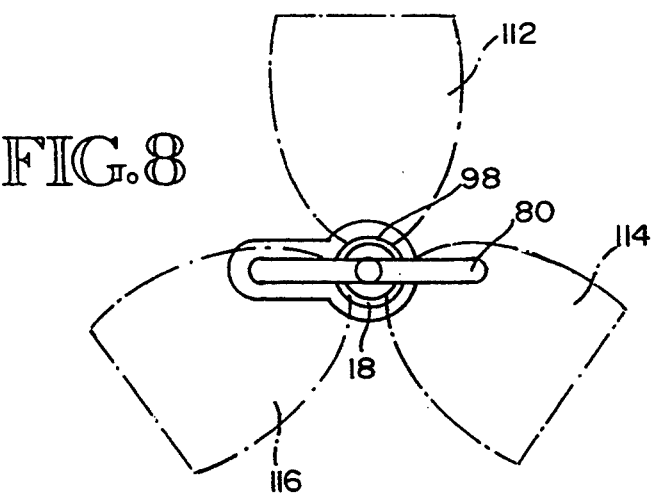
FIG. 8

MULTIFUNCTIONAL ADJUSTABLE IRRIGATION SYSTEM FOR PLANT BEDDING AND LOW CROP ENVIRONMENTS

TECHNICAL FIELD

The invention relates to soil irrigation systems. More specifically, the invention relates to devices for irrigating plant bedding or low crop environments.

BACKGROUND OF THE INVENTION

Irrigation systems for plant bedding environments, or for use in other applications calling for low-profile or soil-direct hydration, are available in a variety of forms. The simplest type of bedding irrigation system uses a perforated, or water permeable, end-capped "soaker" hose for delivering water directly to the soil along the length of the hose. This method has the benefit of allowing the horticulturist, farmer or nursery worker to place the irrigation source adjacent to numerous sites needing hydration which are configured in a spatially nonuniform array.

Another well known form of irrigation system for bedding and low crop environments uses a series of drip or spray fittings coupled to small diameter tubing. Typically, an irrigation system of this type, i.e. a coupled fitting system, includes several meters or more of tubing distributed over a large area of the surface to be irrigated. The tubing may be made to bend or branch by means of U, L or T-shaped connectors, to provide coverage over a greater surface of the irrigated area.

The drip or spray devices employed in coupled fitting irrigation systems may be in-line, or attached to multiple hose segments at their termini. Drip type fittings are relatively simple devices, typically consisting of a small plastic drip attachment coupled to the conduit by means of a male fitting, and elevated above the surface to be irrigated by a ground support device. The drip attachment has a small aperture from which fluid drips directly downward to the soil surface, coupled with an internal means of regulating fluid pressure to achieve a suitable pressure and flow rate from the aperture.

A widely used drip fitting which employs these concepts is the Pressure Compensating Dripper manufactured by Raindrip ®, 21305 Itasca Street, Chatsworth, Calif. 91311. The Raindrip ® drippers are terminal or in line, disc-shaped fittings, having an eccentric aperture on one face of the disc from which the fluid drips. These devices also have an internal pressure governing means whereby flow from the aperture occurs at $\frac{1}{2}$, 1, or 2 gallons per hour (gph), depending on which model of dripper is used. The Raindrip ® dripper is positioned above the surface to be irrigated by means of a plastic stake having a tapered lower end for anchoring the stake in soil, and a ring or c-shaped head for receiving standard bedding irrigation conduit. The principal advantage of drip fittings for bedding irrigation is that, because hydration of the irrigated surface is generally confined to the immediate area surrounding the fitting, these devices allow for more spatially precise irrigation. Drip devices may be placed directly adjacent to or above particular sites requiring irrigation, such as the bases of individual plants, thereby avoiding wasteful irrigation of unplanted surface areas.

The second type of device commonly used in coupled fitting irrigation systems is the spray or sprinkler fitting. Spray fittings generally consist of a small plastic spray attachment coupled to the conduit by means of a male connecter, and elevated above the surface to be irrigated by a ground support device. Spray devices feature a number of advantages over drip type fittings. Most importantly, spray fittings generally possess means for directing fluid flow from an aperture laterally, i.e. horizontal to the irrigated surface, and under substantial pressure. Accordingly, spray fittings typically provide a broader surface area of irrigation coverage than drip fittings.

Spray fittings come in two general forms, static spray fittings and rotary spray fittings. Static spray fittings typically spray fluid over a fixed, wedge or fan-shaped area of the irrigated surface. Different models of static spray fittings cover broader or narrower areas, ranging from a small wedge-shape to a full circular spray pattern. An example of a static spray fitting which generates a sub-circular spray pattern is the Rain-Mister TM manufactured by Raindrip ®. This device is disc-shaped and has a narrow, central, laterally directed aperture from which pressurized fluid escapes in approximately a semicircular spray pattern. Raindrip ® also makes a Low Volume $\frac{1}{4}$-Circle sprayer, which, as the name indicates, generates approximately a $\frac{1}{4}$ circular spray pattern. The Raindrip ®$\frac{1}{4}$ circular sprayer is a simple device having a vertically directed aperture from which pressurized fluid escapes and impinges on a curved, overhanging hood. The back and top of the hood break up the escaping flow into a lateral spray pattern, while confining the lateral spray pattern to an area matching the acutely angled, laterally facing opening of the hood.

In addition to static spray devices for coupled fitting type irrigation systems, at least one type of rotary sprinkler is manufactured for this use. Raindrip ® makes a full-circular rotary sprinkler fitting which closely resembles rotary sprinkler fittings employed in larger scale applications, eg. rotary lawn sprinklers. The Raindrip ® rotary sprinkler has a swiveling head with two diametrically opposed apertures running from the center to the periphery of the head. The head is mounted on a central, hollow fitting which is connected to a pressurized fluid source. Fluid passes through the central fitting into the central openings of the apertures. The apertures are oriented with their longitudinal axes in a non radial position with respect to the head, so that the pressurized fluid running through the apertures exerts torque on the sprinkler head, causing it to rotate. As the sprinkler head rotates, spray from the external openings of the apertures, which themselves emit a sub-circular spray pattern, covers a full-circular area around the sprinkler head.

Several drawbacks attend the use of both conventional drip and spray fittings for plant bedding and low crop irrigation systems. Perhaps the most significant of these problems is that neither type of fitting is readily adjustable in terms of flow direction. Drip fittings are non-directional, in the sense that fluid delivery is strictly oriented downward due to gravity, and hydration therefore only occurs around the base of the fitting or its ground support. Spray fittings on the other hand may be directional, but their directionality is static, or non-adjustable. In other words, spray fittings which direct a sub-circular, or directional, spray pattern may be oriented at the time of their placement so that their spray is directed, for example, toward a particular plant, or away from an edge or corner of a bedding table or crop row. This directional capacity may avoid wasteful over-spray of non-targeted surfaces and provide for more precise irrigation of discrete sites requiring hydration. Such discrete irrigation may not be as readily accomplished using a network of full-circular spray units, which may unnecessarily irrigate spaces between plants, causing excessive fluid consumption.

A major drawback of static directional spray fittings, however, is that once they are installed into a bedding environment a worker can only change their spray direction by manually removing and repositioning the fitting and/or its ground support. This in turn may require the labor-intensive task of repositioning an entire section or portion of a network of fittings interconnected by conduit and coupling devices. Accordingly, the lack of directional adjustability of conventional irrigation fittings may greatly reduce the efficiency of daily irrigation adjustments, as well as more substantial irrigation changes, for example to accommodate new plantings, growth stages and topographical or environmental regimes.

A second major drawback to using conventional drip and spray fittings in plant bedding and low crop environments, is that both types of fittings lack flow rate adjustability. These conventional attachments cannot be individually adjusted to provide different flow rates, even though separate models may be manufactured to individually provide discrete flow rates. Accordingly, a horticulturist, farmer or nursery worker must undertake the laborious task of switching hundreds or thousands of fittings to accommodate the distinct irrigation needs of various species, environmental regimes, or growth phases of plants. Alternatively, accessory devices, such as regulatory valves, may be employed to provide adjustable flow rates in a coupled fitting irrigation system. However, it would be very expensive to provide flow adjusting valves for each drip unit employed in a bedding or low crop irrigation system. Accordingly, to provide the most flexible irrigation system in terms of flow adjustability would generally be cost prohibitive.

A third important shortcoming of using conventional drip and spray fittings in plant bedding and low crop irrigation is that they tend to become clogged by mineral deposits and other contaminants. This clogging is largely attributable to the small apertures through which fluid vents, either as spray or drip flow, from the pressurized source. Because of the small diameter of the apertures, mineral deposits and other contaminants can stick and accumulate until clogging of the aperture occurs. In addition, clogging of conventional drip and spray fittings is attributable to the absence of moving, cleanable parts in the aperture design of such devices.

A final drawback to conventional spray and drip fittings is that each of these types of devices possess unique benefits and flaws which are not found in the other type of device. Drip fittings, because they are placed adjacent to individual plants, provide for precise delivery of fluid to individual subjects. However, this generally imposes a one-fitting/one-subject limitation. On the other hand, spray fittings, due to their laterally directed, pressurized spray pattern, can deliver fluid to a much larger surface area. This same feature may be undesirable when a bedding or low crop environment includes unplanted areas or areas where overspray is otherwise undesirable. In addition, unlike a drip fitting, a spray fitting typically sprays over and beyond the base of the fitting or its ground support, so that the area immediately below and surrounding the fitting typically does not receive irrigation. Accordingly, in order to accomplish full coverage irrigation using spray fittings, it is generally necessary to overlap patterns of multiple fittings to cover the areas below and surrounding each fitting.

On the basis of these considerations, a need exists in the plant bedding and low crop irrigation industry for an inexpensive irrigation system which is adaptable for irrigating narrow or broad areas, and which provides for rapid, easy adjustability of irrigation flow rate and direction. A further need exists for a plant bedding and low crop irrigation system which can provide different spray patterns to accommodate spatial, topographical and other restrictions, and which resists clogging.

SUMMARY OF THE INVENTION

It is therefore an object of the present invention to provide an irrigation system for plant bedding and low crop environments which is inexpensive to manufacture and which is adaptable for use with a conventional fluid supply.

It is a further object of the present invention to provide a plant bedding and low crop irrigation system which is capable of irrigating broad or narrow areas and which provides different spray patterns to accommodate spatial, topographical and other restrictions.

It is a further object of the present invention to achieve the above objects in an irrigation system which is rapidly and easily adjustable in terms of flow rate and direction, including independent adjustability of coupled fittings to facilitate rapid reorientation of a complex network spray pattern without disturbing the overall physical configuration of a network of coupled fittings.

It is a further object of the present invention to achieve the above objects in an irrigation system which is multifunctional in terms of its ability to provide individual fittings having interchangeable drip and spray functions.

It is yet another object of the present invention to achieve the above objects in an irrigation system which includes coupled spray and drip fittings having movable, cleanable parts, so as to resist clogging.

The invention achieves these objects and other objects and advantages which will become apparent from the description which follows by providing a unitary spray fitting with an elongated, helically threaded shaft sized for insertion into a terminal aperture of an inner bore of conventional plant bedding irrigation conduit. The invention also provides a separate ground support device for supporting the terminal aperture relative to a surface to be irrigated. The shaft is longitudinally helically threaded so that pressurized fluid travels between the shaft and inner bore of the conduit along a path corresponding to a helical groove of the thread. In the properly mounted configuration, a segment of the helical groove coincides with the terminal aperture at a point of venting, whereby venting occurs in a lateral spray pattern resembling a leaf or fan. By longitudinally repositioning the shaft within the bore it is possible to adjust the rate and direction of venting to accommodate different irrigation needs. Repositioning the shaft also serves to dislodge any mineral or other material which may have deposited between the shaft and bore.

In a preferred embodiment of the invention, the shaft has a plurality of longitudinal helical threads so that at least two segments of grooves coincide with the terminal aperture at at least two points of venting, whereby venting occurs in a lateral spray pattern resembling at least two diametrically separated leaves. In another preferred embodiment the invention includes a housing which fits over the spray fitting and blocks lateral venting, whereby the spray fitting is effectively converted into a drip fitting. In addition, the invention preferably includes a ground support device featuring a vertical support element comprising a rod having a diameter approximately the same as a standard metal coat hanger, and a conduit receiving element having female receptacles for receiving an end of irrigation conduit and an end of the vertical support element.

BRIEF DESCRIPTION OF THE DRAWINGS

FIG. 1 is an environmental view showing a plant bedding irrigation system employing the concepts of the present invention.

FIG. 2 is an exploded isometric view of a portion of the irrigation system shown in FIG. 1.

FIG. 2A is a sectional, isometric view of a portion of the irrigation system of the present invention, taken along line 2A—2A of FIG. 1.

FIG. 3 is a bottom plan view of a spray fitting element of the present invention having a double helically threaded shaft.

FIG. 4 is a top plan view depicting a double helically threaded spray fitting and showing the double leaf spray pattern attributable to this embodiment of the invention.

FIG. 5 is a bottom plan view of a spray fitting element of the present invention having a single helically threaded shaft.

FIG. 6 is a top plan view depicting a single helically threaded spray fitting and showing the single leaf spray pattern attributable to this embodiment of the invention.

FIG. 7 is a bottom plan view of a spray fitting element of the present invention having a triple helically threaded shaft.

FIG. 8 is a top plan view depicting a triple helically threaded spray fitting and showing the triple leaf spray pattern attributable to this embodiment of the invention.

DETAILED DESCRIPTION OF THE PREFERRED EMBODIMENTS

An irrigation system for plant bedding environments employing the principles of the present invention is generally depicted in FIG. 1. The irrigation system includes a tubular conduit 12 for connection to a pressurized fluid source 14. Referring to FIGS. 2 and 2A, the conduit has an inner bore 16 defining a terminal aperture 18. As shown in FIG. 1, the irrigation system of the present invention also includes a ground support device comprising a conduit receiving collar 20 connected in a unitary molded construction to a mounting flange 22 designed to engage a vertical support rod 24 made from ordinary coat hanger wire. The ground support device supports the terminal aperture 18 of the conduit 12 relative to an irrigated surface 26. The spray fitting 28 and housing 34 are preferably manufactured from a non-corrosive material such as a polycarbonate manufactured by General Electric Company under the trademark Lexan ®.

In addition to the conduit 12 and ground support device, the irrigation system shown in FIG. 1 includes an elongated spray fitting 28 extending from the terminal aperture 18 of the conduit. The spray fitting functions to spray water or other fluid in a lateral pattern resembling double fan-shaped leaves 30, 32. However, when the spray fitting is covered by a snap-on drip housing 34, the lateral spray leaves 30, 32 are blocked by overhanging sides 36 of the drip housing, and the spray fitting 28 is effectively converted to a drip irrigation device, whereby drops of fluid 38, 40 descend directly downward from a bottom opening 42 of the housing 34 onto the irrigated surface 26.

The tubular conduit 12 employed in the present invention comprises a standard conduit made of flexible plastic or other suitable material. As shown in FIG. 2, the conduit has a standard outer diameter 44 of ¼ inch, and a standard inner diameter 46 of 3/16 inch. The conduit 12 is connected to the pressurized fluid source 14, as shown in FIG. 1, using conventional, nipple-type male connecters and sleeve-type hose clamps 48, 50. The pressurized fluid source itself may be constructed from a wide range of standard plumbing fittings 52, 54, 56, made of plastic, polyvinyl chloride (PVC), metal or other suitable material.

In an alternate method of attachment, the pressurized fluid source 14 can be drilled with a tapered bore having a small end diameter of approximately 0.012 to 0.015 inch smaller than the outer diameter of the ¼ inch tubing, and a surface diameter slightly larger than the tube. By making a tapered cut in the tubing itself, the tubing can be forced through this restriction whereupon the tubing will become trapped by the constricted end of the bore. Such arrangement has successfully withstood pressures of up to 70 psi.

During irrigation, as shown in FIG. 1, the terminal aperture 18 of the conduit 12 is supported relative to the irrigated surface 26 by the ground support, consisting of the conduit receiving collar 20 connected to the mounting flange 22 which is adapted to receive the vertical support element 24. Referring to FIG. 2, the conduit receiving collar 20 has an inner bore having a diameter 60 approximately the same size as the outer diameter 44 of the conduit 12, i.e. about ¼ inch. During assembly of the irrigation system, an end 62 of the conduit is manually inserted partially or entirely through the inner bore 58 of the conduit receiving collar 20. Upon insertion of the conduit 12 into the collar, the collar securely engages the conduit in a friction fit.

Before or after the conduit 12 has been friction mounted within the bore 58 of the conduit receiving collar 20, the mounting flange 22 which is joined to the collar is itself fitted onto the vertical support element 24. This is accomplished by inserting an end 64 of the vertical support element 24 into a bore 66 defined by walls 68 of the mounting flange 22. The bore of the mounting flange is sized to receive the vertical support rod 24, which has a diameter approximately in the range of 1.5–3.0 mm, so that a conventional coat hanger wire may be used as the vertical support rod.

It is important to note that the bore 66 of the mounting flange 22 may engage the end 64 of the vertical support rod 24 in a number of ways. In the preferred embodiment, the mounting flange bore 66 has a non-circular, eg. hexagonal, cross-sectional shape with a minimum cross-sectional width 72 slightly narrower than the diameter 70 of the vertical support rod, as shown in FIG. 2A. With this configuration, manual insertion of the end 64 of the vertical support rod 24 into the bore 66 of the mounting flange 22 partially expands or reams the side 74 of the bore 66 to a point where the end 64 of the vertical support rod rests on a lower ledge 76 of a non-expanded, upper portion 77 of the bore. This design results in a tight friction fit between the side 74 of the bore 66 and the vertical support rod 24, and prevents the rod from sliding all the way through the bore. A tight friction fit is not required however, because the mounting flange bore 66 can be made as a blind-ended bore, i.e. to extend only partially from the bottom toward the top of the mounting flange. Using the latter design, the vertical support rod 24 can fit loosely in the mounting flange bore 66 while the mounting flange itself rests on the end 64 of the vertical support member. Other mounting designs for the vertical support rod are conceivable which would facilitate handling during installation, adjustment and removal of the irrigation system in different settings.

The vertical support rod 24 of the present invention provides for a great deal of flexibility in designing, installing and adjusting plant bedding irrigation systems. The rod itself can vary widely in terms of its height, eg. from a few inches to several feet, depending on the foliage profile and topographical features of the subjects and substrates to be irrigated. In this context, it is particularly useful that the present invention allows for the use of economical materials, such as conventional coat hanger wire, to fashion the vertical support rod.

To install the present irrigation system in a particular bedding environment, the vertical support rod 24 is simply pushed like a stake into the substrate to be irrigated 26 at a desired location, until it becomes firmly anchored. The vertical support rod can be inserted normal to the substrate surface, or at any lesser angle incidental thereto, depending on the desired hydration pattern and other factors. The fundamental role of the vertical support rod is merely to support the terminal aperture 18 of the conduit 12, in conjunction with the conduit receiving collar 20 and mounting flange 22, in a desired location and orientation relative to the surface to be irrigated 26.

The elongated spray fitting 28, provides numerous advantages over conventional spray fittings. As shown in FIGS. 2 and 2A, the spray fitting has an economical, unitary construction, including an elongated shaft 78 connected to a t-shaped head 80. The shaft has a maximum diameter of 3/16 inch to allow adjustable mounting of the shaft within the bore 16 of the conduit. The shaft 78 has a longitudinally directed, helical thread 82 which functions, in conjunction with other elements of the irrigation system, to regulate flow rate and direction of fluid spray 84 venting at the terminal aperture 18 of the conduit 12.

In order to regulate flow rate and direction of fluid spray, the spray fitting 28 must be partially inserted into the bore 16 of the conduit 12, as shown in FIG. 2A. This is accomplished by manually engaging the t-shaped head 80 of the spray fitting and rotating the threaded shaft 78 into the bore 16 of the conduit 12. When the shaft 78 is partially inserted into the bore 16, the helical thread 82 acts to regulate and channel fluid flow within the bore 16 and at the terminal aperture 18 of the bore. Fluid from the pressurized fluid source 14 flows toward the terminal aperture 18 of the bore in the direction indicated by the arrow 85 in FIG. 2A, and impinges on the base 86 of the shaft 78. Fluid travelling past the base of the shaft is prevented from flowing past internal barrier points 88 where an apex 90 of the helical thread 82 contacts an inner wall 92 of the conduit bore 16. Instead, fluid must pass into a helical groove 94 of the helical thread, wherein it flows in a narrow, helical path, indicated by the arrows 95 in FIG. 2A, toward the terminal aperture 18 of the bore 16.

When fluid travelling in the groove 94 of the helical thread 82 reaches the terminal aperture 18 of the bore 16, it is prevented from flowing past a terminal barrier point 96 where the apex of the helical thread contacts the inner wall 92 of the bore 16. Instead, fluid must vent out of the terminal aperture 18 at a venting point 98 where a segment of the groove 94 of the thread 82 coincides in longitudinal position with the terminal aperture 18 of the conduit 12. Due to the narrowness and configuration of the opening which comprises the venting point 98, fluid which passes through this opening vents in the form of a high pressure, laterally directed, leaf-shaped fluid spray 84.

The invention also allows for easy and rapid adjustment of both the rate and direction of venting of fluid spray 84 from the terminal aperture 18 of the conduit 12. By repositioning the shaft 78 of the spray fitting 28 longitudinally within the bore 16 of the conduit without rotating the shaft, the point of venting 98 and the terminal barrier point 96 automatically change angularly about the longitudinal axis of the shaft, due to the helical configuration of the threading 82 on the shaft. Accordingly, by this simple adjustment a horticulturist or nursery worker can make delicate changes in the direction of venting of fluid spray 84 to provide more spatially precise irrigation.

Adjusting the rate of flow of fluid spray 84 from the point of venting 98 also involves the simple step of longitudinally adjusting the position of the spray fitting shaft 78 within the bore 16 of the conduit 12. Flow rate can be diminished incrementally by rotating the shaft further into the bore. This increases the length of the path of fluid flow within the narrow, helical groove 94 of the helical thread 82, wherein resistance to fluid flow is high. Conversely, flow rate can be increased by rotating the shaft in an opposite direction so as to cause the shaft 78 to partially withdraw from the bore 16, whereby resistance to fluid venting is diminished in accordance with the shortened path of fluid flow within the groove 94 of the helical thread 82. Based on these principles, it is even possible to shut off fluid flow from the point of venting 98 entirely, simply by rotating the shaft 78 far enough into the bore 16. This is a particularly useful feature, because it enables more temporally and spatially precise irrigation, and because flow modulation from one or more spray fittings in a coupled fitting network can serve to regulate pressure and flow from other fittings in the same network. This allows for more rapid and precise adjustments within a coupled fitting irrigation system.

Another important aspect of the present irrigation system is its multi-functionality in terms of its ability to produce various, functionally distinct patterns of fluid spray 84 from one or more points of venting 98 (see FIG. 2A). As shown in FIG. 1, the basic spray pattern of the invention is one or more fan-shaped leaves 30, 32. However, different embodiments of the invention can produce either a 1, 2 or 3-leaf spray pattern, depending on the number of helical threads 82 incorporated on the shaft 78 of the spray fitting 28. As shown in FIGS. 5 and 6, a single helical thread 100 on the shaft 78 produces a spray pattern consisting of a single leaf 102. As shown in FIGS. 3 and 4, a double helical thread 104 produces a spray pattern consisting of two leaves 106, 108. As shown in FIGS. 7 and 8, a triple helical thread 110 produces a spray pattern consisting of three leaves 112, 114, 116. These designs provide for multi-functionality in terms of spray pattern on the basis that they provide 1, 2, or 3 points of venting 98, respectively, from the terminal aperture 18 of the conduit 16, corresponding to the number of helical threads 82 incorporated on the shaft 78 of the spray fitting 28. These three embodiments of the invention also differ structurally in terms of the number of apices 90 of helical threads 82 occurring per inch along the longitudinal axis of the shaft 78. For the single, double and triple helical threaded embodiments, approximate values of 8, 16 and 24 apices of helical grooves per inch respectively have been found to provide satisfactory results.

The key benefit of spray pattern multi-functionality over conventional spray fittings is that different spray patterns can be employed to serve discrete purposes. For example, a single leaf spray pattern would be useful where spatially precise irrigation was desirable, whereas a triple leaf spray pattern would be more useful for covering broader areas. A distinct preferred use for the double leaf spray pattern might be to irrigate narrow rows of plants. Regardless, it is clear that the multi-functionality of the present invention is important to its utility. Accordingly, it is also important to note the ease with which a particular spray fitting 28 can be removed and replaced with an alternative fitting having a different spray pattern.

A final advantage of the present invention is its ability to function alternatively as either a spray or a drip irrigation system. In the spray mode of operation, depicted on the left hand side of FIG. 1 and in FIG. 2A, the irrigation system produces a high pressure, laterally oriented fluid spray 84 in the form of one or more leaves 30, 32. However, when the spray fitting 28 is covered by a snap-on drip housing 34, as shown on the right hand side of FIG. 1, the lateral spray is blocked by overhanging sides 36 of the drip housing. This effectively converts the spray fitting 28 into a drip irrigation device, whereby drops of fluid 38, 40 descend directly downward from a bottom opening 42 of the housing 34 onto the surface to be irrigated 26.

The drip housing 34 can be made according to a number of designs, including the design shown in FIG. 2, provided that the housing fits over the spray fitting 28 and has lateral walls 36 which overhang far enough to block lateral fluid spray. Accordingly, the drip housing depicted in FIG. 2 has a pair of elongate portions 118, 120 and an apical aperture 122 defined by walls 124 of a dome-like extension 126, to accommodate the t-shaped head 80 of the spray fitting 28. The apical aperture 122 of the drip housing 34 serves to permit passage of an upper prong 128 of the t-shaped head 80, and to securely engage this upper prong in a friction fit. This friction fit is accomplished by virtue of a close match between the diameter 130 of the apical aperture 122 and the diameter 132 of the upper prong 128. The snap-on friction fit formed when the upper prong is inserted through the apical aperture in turn secures the housing 34 so that it is not blown off position by fluid pressure. The only other important feature of the drip housing 34 are its walls 36, which are designed so that, when the housing is in the mounted position shown in FIG. 1, the walls extend below the terminal aperture 18 of the conduit 12 (see FIGS. 2 and 2A).

Manufacture of the spray fitting 28, drip housing 34 and combined conduit receiving collar 20 / mounting flange 22 of the present invention can be done using a variety of well known materials and fabrication processes. Suitable materials include plastics, polyvinyl chloride and other moldable materials with appropriate hardness and rigidity. A preferred manufacturing process is injection molding, however other molding processes would also be suitable.

Those with ordinary skill in the art will appreciate that other embodiments and variations of the invention are possible which employ the same inventive concepts described above. Therefore, the invention is not to be limited by the above disclosure but is to be determined in scope by the claims which follow.

What is claimed is:

1. An irrigation system comprising:
   a tubular conduit for connection to a pressurized fluid source, the conduit defining an elongated smooth, unthreaded inner bore having a longitudinal axis and a terminal aperture; and,
   a one piece, rigid unitary fitting made from a substantially non-corrosible material, the fitting having an elongated, constant diameter helically threaded shaft, the shaft being at least partially inserted into the longitudinal axis of the bore so as to defining a helical groove for fluid flow between the shaft and a smooth inner wall of the bore, wherein a segment of the helical groove coincides with the terminal aperture at a point of venting for a fluid flow from the aperture, wherein the threaded shaft has a thread pitch sufficiently coarse to vent pressurized fluid at the point of venting in a lateral spray pattern resembling at least one fan-shaped leaf.

2. The irrigation system of claim 1, wherein the shaft has a plurality of longitudinal helical threads so that a plurality of segments of helical grooves coincide with the terminal aperture at a plurality of points of venting for fluid flow from the aperture, whereby the lateral spray pattern resembles a plurality of separated leaves.

3. The irrigation system of claim 1, including a drip housing connected to the unitary fitting, the housing extending downward to surround the terminal aperture so that sides of the housing block lateral spray from the point of venting, whereby fluid venting laterally from the aperture impinges on the sides of the housing and subsequently drips downward from an open base of the housing.

4. The irrigation system of claim 1, including ground support means for supporting the terminal aperture relative to a surface to be irrigated, the ground support means having a support receiving element defining a conduit receiving collar for receiving the conduit and a female receptacle for securely receiving a vertical support rod having approximately the same diameter as a conventional metal coat hanger.

5. The irrigation system of claim 1, wherein the conduit has an outer diameter of approximately ¼ inch, a bore diameter of approximately 3/16 inch, and wherein the shaft has a maximum diameter of approximately 3/16 inch.

6. The irrigation system of claim 1, wherein a helical thread of the shaft has less than nine apices of helical thread per inch.

7. An irrigation system comprising:
   A tubular conduit for connection to a pressurized fluid source, the conduit defining a smooth, unthreaded inner bore, a longitudinal axis and a circular, uncrenulated terminal aperture; and
   a unitary, rigid spray fitting made from a substantially non-corrosible material, the fitting having an elongated, constant diameter coarsely helically threaded shaft, the shaft being at least partially inserted into the bore along the longitudinal axis so as to define a steeply pitched helical groove for fluid flow between the shaft and a smooth wall the bore, wherein a segment of the helical groove coincides with the terminal aperture and the threads are sufficiently coarse so that venting of the fluid can occur in a lateral spray pattern resembling at least one fan-shaped leaf.

8. The irrigation system of claim 7, wherein the shaft has a plurality of helical threads so that a plurality of segments of helical grooves coincide with the terminal aperture at a plurality of points of venting for fluid flow from the aperture, whereby the lateral spray pattern resembles a plurality of separated leaves.

9. The irrigation system of claim 7, including a drip housing connected to the unitary fitting, the housing extending downward to surround the terminal aperture so that sides of the housing block lateral spray from the point of venting, whereby fluid venting laterally from the aperture impinges on the sides of the housing and subsequently drips downward from an open base of the housing.

10. The irrigation system of claim 7, including ground support means for supporting the terminal aperture relative to a surface to be irrigated, the ground support means having a support receiving element defining a female receptacle for securely receiving a vertical support rod having approximately the same diameter as a conventional metal coat hanger.

11. The irrigation system of claim 7, wherein the conduit has an outer diameter of approximately ¼ inch, a bore diameter of approximately 3/16 inch, and wherein the shaft has a maximum diameter of approximately 3/16 inch.

12. The irrigation system of claim 7, wherein a helical thread of the shaft has less than 9 apices of helical thread per inch.

13. A method for irrigating plant bedding and low crop environments comprising:
directing fluid to flow from a pressurized source in a steep helical path formed by a coarsely threaded, elongated spray fitting inserted into a longitudinally terminal directed terminal aperture of a tubular conduit having a smooth, untreaded inner bore;
blocking fluid flow in a longitudinal direction at the terminal aperture; and
venting the fluid in a leaf-shaped lateral spray pattern over a surface to be irrigated.

14. The method of claim 13, further comprising the step of longitudinally repositioning the spray fitting within the conduit without rotating the fitting with respect to the conduit, whereby a direction of the spray pattern and a rate of flow of fluid venting over the surface to be irrigated changes.

15. The method of claim 13, wherein during the directing step, fluid flows from the pressurized source in multiple, parallel helical paths, during the blocking step, fluid flow is blocked in the longitudinal direction at multiple points at the terminal aperture, and, during the venting step, fluid is vented from multiple points of venting in a lateral spray pattern resembling multiple fan-shaped leaves over the surface to be irrigated.

16. The method of claim 15, including the step of longitudinally repositioning the spray fitting within the conduit without rotating the fitting with respect to the conduit, whereby the spray pattern and a rate of flow of fluid venting over the surface to be irrigated changes.

* * * * *

UNITED STATES PATENT AND TRADEMARK OFFICE
CERTIFICATE OF CORRECTION

PATENT NO. : 5,435,490
DATED      : Jul. 25, 1995
INVENTOR(S) : Daniel M. Machut It is certified that error appears in the above-indentified patent and that said Letters Patent is hereby corrected as shown below:

Column 10, line 20, delete the word "defining" and insert the word —define—
Column 12, line 9, delete the first "terminal"
Column 12, line 10, delete the word "untreaded" and insert the word —unthreaded—

Signed and Sealed this

Nineteenth Day of September, 1995

Attest:

BRUCE LEHMAN

Attesting Officer

Commissioner of Patents and Trademarks